(12) United States Patent
Shieh et al.

(10) Patent No.: US 10,647,582 B1
(45) Date of Patent: May 12, 2020

(54) HIGH EFFICIENCY SYNTHESIS AND PURIFICATION RECYCLING SYSTEM OF HIGHER SILANE

(71) Applicant: Taiwan Speciality Chemicals Corporation, Changhua County (TW)

(72) Inventors: Sung-Yueh Shieh, Changhua County (TW); Teng-Chih Lee, Changhua County (TW)

(73) Assignee: Taiwan Speciality Chemicals Corporation, Changhua County (TW)

( * ) Notice: Subject to any disclaimer, the term of this patent is extended or adjusted under 35 U.S.C. 154(b) by 0 days.

(21) Appl. No.: 16/567,559

(22) Filed: Sep. 11, 2019

(51) Int. Cl.
| | | |
|---|---|---|
| *C01B 33/04* | (2006.01) | |
| *B01J 19/00* | (2006.01) | |
| *B01D 3/14* | (2006.01) | |
| *B01D 29/66* | (2006.01) | |
| *B01D 29/52* | (2006.01) | |
| *B01J 12/00* | (2006.01) | |
| *B01J 19/18* | (2006.01) | |
| *F25J 1/00* | (2006.01) | |

(52) U.S. Cl.
CPC ............ *C01B 33/046* (2013.01); *B01D 3/143* (2013.01); *B01D 29/52* (2013.01); *B01D 29/66* (2013.01); *B01J 12/00* (2013.01); *B01J 19/0013* (2013.01); *B01J 19/1806* (2013.01); *B01J 19/1881* (2013.01); *F25J 1/0002* (2013.01); *B01J 2219/00132* (2013.01); *C01P 2006/80* (2013.01); *F25J 2200/08* (2013.01)

(58) Field of Classification Search
CPC ..... C01B 33/046; C01B 33/043; C01B 33/04; B01J 19/0013; B01J 19/1806; B01J 19/1881; B01J 19/0066; B01J 2219/00051; B01J 2219/00054; B01J 2219/00074; B01J 2219/00132
See application file for complete search history.

(56) References Cited

U.S. PATENT DOCUMENTS 9,034,292 B2 * 5/2015 Lee .......................... C01B 33/04
423/347

* cited by examiner

*Primary Examiner* — Lessanework Seifu

(57) ABSTRACT

The high-efficiency synthesis and purification recycling system of higher silane has a liquid nitrogen cooling system. The liquid nitrogen cooling system has a liquid nitrogen storage tank for being configured to distribute −196° C. liquid nitrogen via a first cooling tube to the hydrogen column and the mono-silane column for a first cooling process; a second cooling tube is configured to distribute −160° C. nitrogen after the first cooling process into the first distillation column, the second distillation column, the third distillation column and the recycling drum for a second cooling process, a third cooling tube is configured to distribute −30° C. nitrogen after the second cooling process into the disilane drum for a third cooling process, and a fourth cooling tube is configured to distribute 25° C. nitrogen after the third cooling process into the silicon particle disposal system for a blowback regeneration process and to generate an anaerobic environment.

8 Claims, 3 Drawing Sheets

HIGH EFFICIENCY SYNTHESIS AND PURIFICATION RECYCLING SYSTEM OF HIGHER SILANE

BACKGROUND OF INVENTION

Field of Invention

The present invention relates to a synthesis system of higher silane, and more particularly to a high-efficiency synthesis and purification recycling system of higher silane.

Description of the Related Art

Both mono-silane and disilane are SEG (special electronic grade gas), and they are mainly used for thin film deposition and epitaxy. Mono-silane is mainly employed in LCD panels, solar cells, energy-saving glass, and mixed gas industries. Disilane is mainly employed in high-quality electronics industries including logic chips, NAND FLASH, DRAM, foundry, LED wafers and derivatives. The current mono-silane market price is below US$100 per kilogram, and the current disilane market price is several thousand US dollars per kilogram. The reason is that the production technology of disilane products is more difficult, and the market is in short supply and the market demand is expected to increase in the future. Because disilane is superior to mono-silane at the epitaxial film with low roughness, fast film deposition speed, and low deposition temperature, disilane will replace of silane in the very short future due to market demand. However, conventional disilane reaction process still has some shortcomings, the main reasons are as follows: (1) The reactor for disilane has very low efficiency. In the new high purity disilane production technology, low-pressure high-concentration disilane at the top of the conventional purification distillation column is either exhausted to the gas scrubber, which is 0% recycle rate, or compressed for recycling, which has 10 to 50% recycle rate. Therefore, the low-pressure high-concentration disilane discharged from the top of the purified distillation column cannot be effectively and comprehensively recycled, thereby reducing the recycle rate of distillation purification and increasing the cost of the synthesis reaction. (2) The conventional purification distillation process for disilane requires a cooling system and various refrigerant systems in a wide range from $-80°$ C. to $-30°$ C., which increases the cost. (3) The reaction system is designed to have a large diameter and volume, for example, a volume of 200-400 liters, which tends to cause uneven temperature inside the reactor, and thus the reaction efficiency is poor. For improvement, a rotating shaft and a plurality of the fan are installed in the reactor and the fan is rotated by the flow rate of the fluid entering the reactor, so the reaction gas is fully stirred and uniformly heated by the fan to perform high silane synthesis reaction with high efficiency. (4) Furthermore, the filter set maintenance and demolition can cause safety and environmental problems, such as the formation of microsilica will gradually reduce the efficiency of the filter set, however, cleaning and maintenance of the filter set is prone to the risk of fire and environmental pollution.

Therefore, it is desirable to provide a high-efficiency synthesis and purification recycling system of higher silane to mitigate and/or obviate the aforementioned problems.

SUMMARY OF THE INVENTION

An objective of present invention is to provide a high-efficiency synthesis and purification recycling system of higher silane, which can achieve a high energy-saving, high-yield, high-purity and high-efficiency disilane reaction.

To achieve the above mentioned objective, a high efficiency synthesis and purification recycling system of higher silane has a reaction system for higher silane, a purification system for disilane, a recycle system for disilane and a liquid nitrogen cooling system. The reaction system for higher silane has a mono-silane drum, a mono-silane preheater, a reactor, a compressor, a hydrogen column and a mono-silane column. The mono-silane drum is connected to the mono-silane preheater and the mono-silane preheater is connected to the reactor to heat mono-silane before entering into the reactor. The reactor is connected to a silicon particle disposal system to pass and filter generated microsilica through the silicon particle disposal system. The silicon particle disposal system is connected to the compressor, the hydrogen column and the mono-silane column. The hydrogen column removes non-condensed hydrogen. The mono-silane column is connected to a bottom of the hydrogen column, mono-silane separated from the mono-silane column is returned into the mono-silane preheater for recycling in the reaction system for higher silane.

The purification system for disilane sequentially is connected to a crude disilane drum, a first distillation column, a second distillation column, a third distillation column and a disilane drum. Disilane and higher silane compounds is separated from the bottom of the mono-silane column and stored in the crude disilane drum and then enters into the first distillation column, the second distillation column and the third distillation column for fractional purification, and purified high purity disilane is stored in the disilane drum.

The recycling system for disilane has at least one recycling drum connected to a plurality of import tubes and a recycling tube, and the import tubes is sequentially connected to the first distillation column, the second distillation column, the third distillation column and the disilane drum. Low purity mono-silane and disilane flows into the recycling drum, and helium gas is added into the recycling drum sending recycled disilane liquid into the crude disilane drum through the recycling tube for further fractional purification. The liquid nitrogen cooling system has a liquid nitrogen storage tank for storing and supplying nitrogen. The liquid nitrogen storage tank is configured to distribute $-196°$ C. liquid nitrogen via a first cooling tube to the hydrogen column and the mono-silane column for a first cooling process; a second cooling tube is configured to distribute $-160°$ C. nitrogen after the first cooling process into the first distillation column, the second distillation column, the third distillation column and the recycling drum for a second cooling process; a third cooling tube is configured to distribute $-30°$ C. nitrogen after the second cooling process into the disilane drum for a third cooling process; a fourth cooling tube is configured to distribute $25°$ C. nitrogen after the third cooling process into the silicon particle disposal system for a blowback regeneration process and to generate an anaerobic environment.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
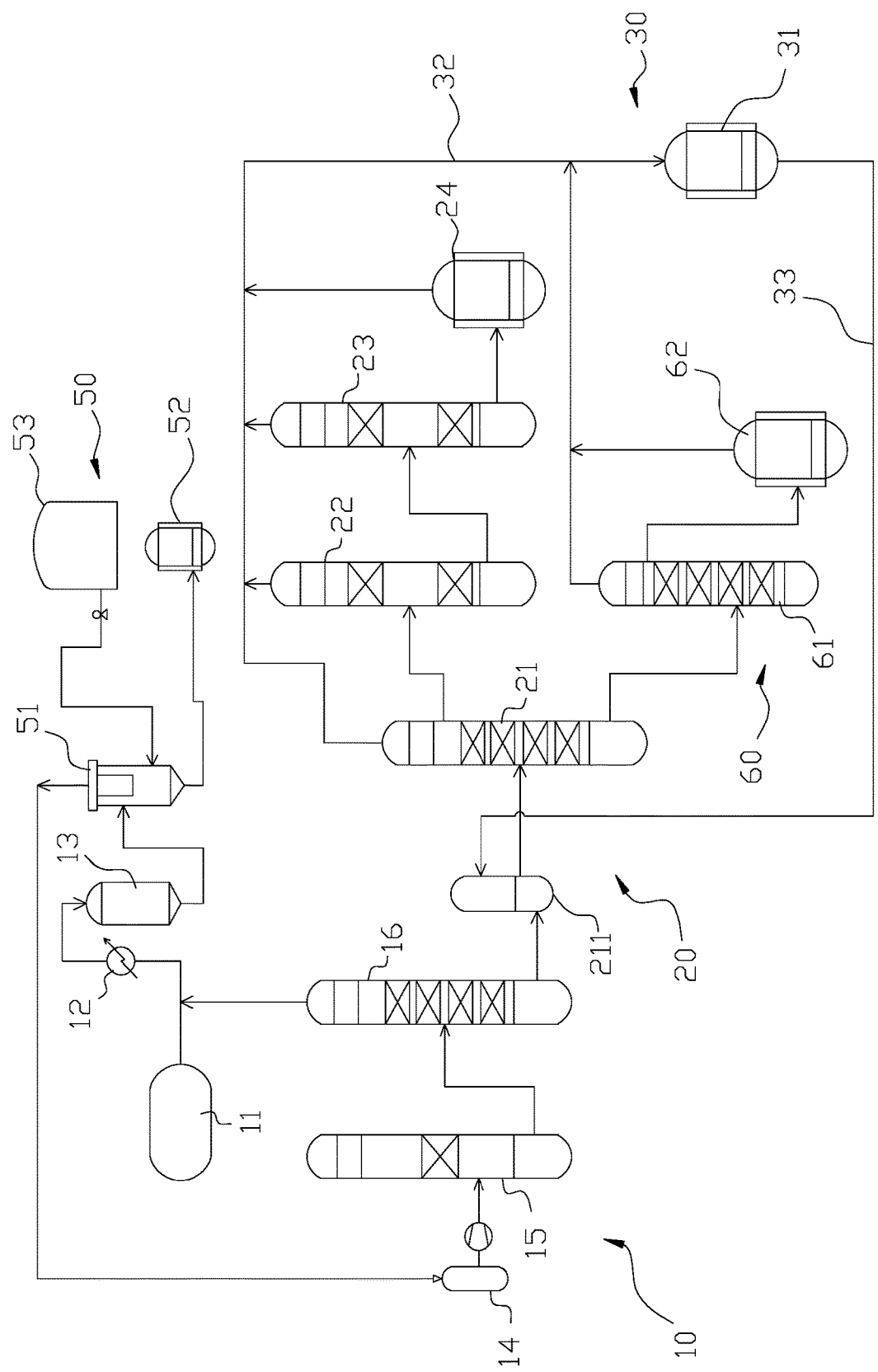
FIG. 1 is a system flow diagram of the present invention.
Figure 2:
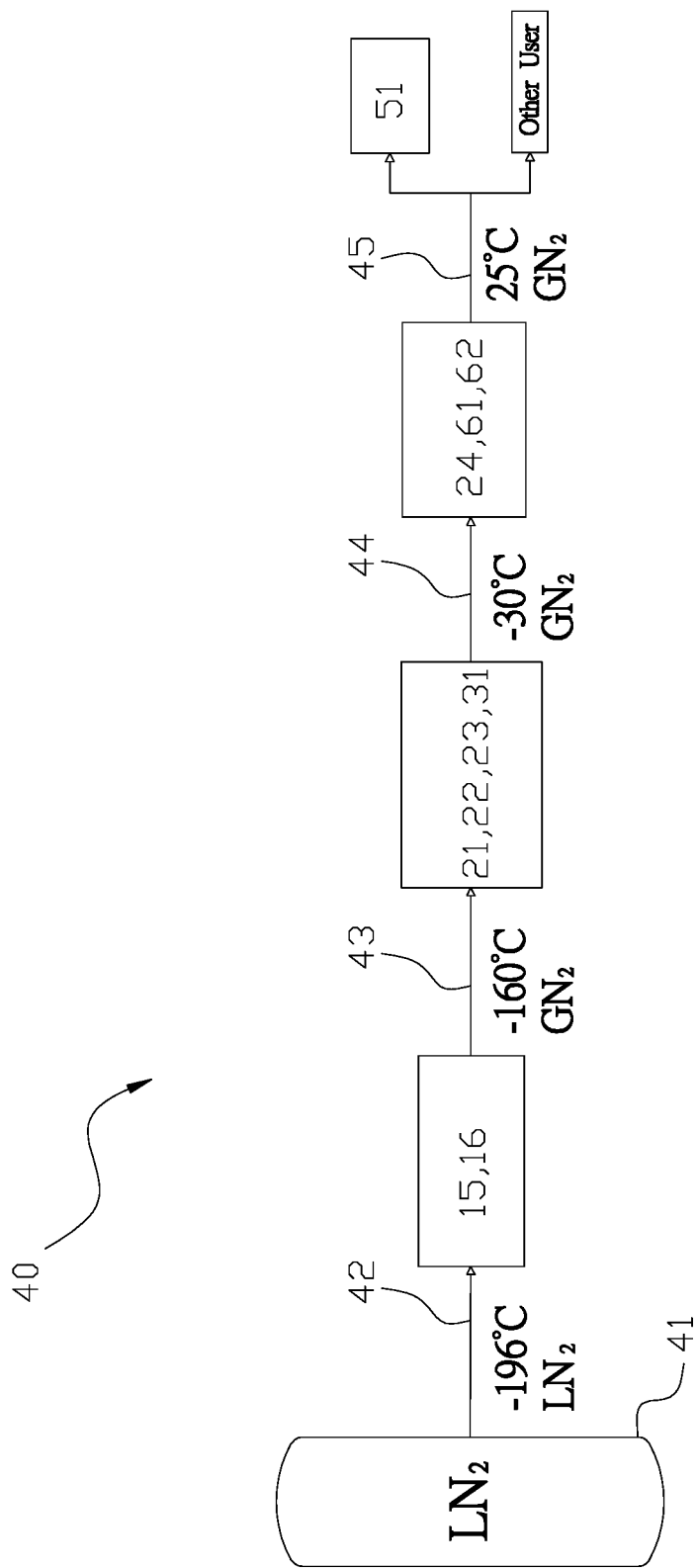
FIG. 2 is a system flow diagram of the liquid nitrogen cooling system of the present invention.

Please refer to FIG. 1 and FIG. 2. A high-efficiency synthesis and purification recycling system of higher silane comprises: a reaction system for higher silane 10, a purification system for disilane 20, a recycle system for disilane 30 and a liquid nitrogen cooling system 40. The reaction system for higher silane 10 has a mono-silane drum 11, a mono-silane preheater 12, a reactor 13, a compressor 14, a hydrogen column 15 and a mono-silane column 16. The mono-silane drum 11 is connected to the mono-silane preheater 12 and employed as a silane supplyment resource. The mono-silane preheater 12 is connected to the reactor 13, such that the mono-silane preheater 12 and the reactor 13 (the electrical heater 133) heat up the mono-silane to temperature 420° C.~480° C. in the reactor 13 and transform mono-silane into disilane and higher silane. The reactor 13 is connected to a silicon particle disposal system 50 to pass and filter generated microsilica through the silicon particle disposal system 50, to prevent from blocking. The silicon particle disposal system 50 is connected to the compressor 14, the hydrogen column 15 and the mono-silane column 16. The compressor 14 compresses and transport the silane gas mixture, and non-condensing hydrogen, nitrogen, oxygen, carbon monoxide and methane is extracted from the top of the hydrogen column 15. The mono-silane column 16 is connected to a bottom of the hydrogen column 15, and mono-silane separated at the top of the mono-silane column 16 is returned into the mono-silane preheater 12 for recycling in the reaction system for higher silane. The purification system for disilane 20 is sequentially connected to a crude disilane drum 211, a first distillation column 21, a second distillation column 22, a third distillation column 23 and a disilane drum 24. Disilane and higher silane compounds separated from a bottom of the mono-silane column 16 is stored in the crude disilane drum 211 and then sent into the first distillation column 21, the second distillation column 22 and the third distillation column 23 for fractional purification to separate mono-silane, disilane and higher silane compounds with vapor pressure differences generated by different pressure. Afterward, purified high purity disilane stored in the disilane drum 24. The recycle system for disilane 30 has at least one recycle drum 31 connected to a plurality of import tubes 32 and a derived tube 33. The import tube 32 of the recycle drum 31 is connected to the first distillation column 21, the second distillation column 22, the third distillation column 23 and the disilane drum 24, such that low purity mono-silane and disilane is sucked back to the recycle drum 31 and helium gas added to pressurize the recycle drum 31 to send sending the recycled disilane liquid into the crude disilane drum 211 through the derived tube 33 for further fractional purification. Then, −160° C. nitrogen from the liquid nitrogen cooling system 40 is added to cool the recycle drum 31. Since −160° C. nitrogen is lower than the curing temperature of disilane (−133° C.), disilane gas is directly solidified into a solid state. The recycle drum 31 has −1.0 kg/cm2G vacuum degree, so the import tube 32 is filled with disilane, which achieves 99% recycling rate. There are two recycle drums 31 for alternating use, one draws in insufficient disilane gas with a cooling temperature difference and another raises the temperature up to 25° C. to generate pressure and employs helium gas to push disilane liquid back to the crude disilane drum 211. The liquid nitrogen cooling system 40 having a liquid nitrogen storage tank 41 for storing and supplying nitrogen (LN2). The liquid nitrogen storage tank 41 is configured to distribute −196° C. liquid nitrogen via a first cooling tube 42 to the hydrogen column 15 and the mono-silane column 16 for a first cooling process; a second cooling tube 43 is configured to distribute −160° C. nitrogen (GN2) after the first cooling process into the first distillation column 21, the second distillation column 22, the third distillation column 23 and the recycle drum 31 for a second cooling process; a third cooling tube 44 is configured to distribute −30° C. nitrogen (GN2) after the second cooling process into the disilane drum 24 for a third cooling process; finally a fourth cooling tube 45 is configured to distribute 25° C. nitrogen after the third cooling process into the silicon particle disposal system 50. Therefore, the liquid nitrogen can be reused to reduce the operation cost, and the recycling system for disilane 30 can be used to achieve a high energy-saving, high-yield, high-purity and high-efficiency disilane reaction.

Figure 3:
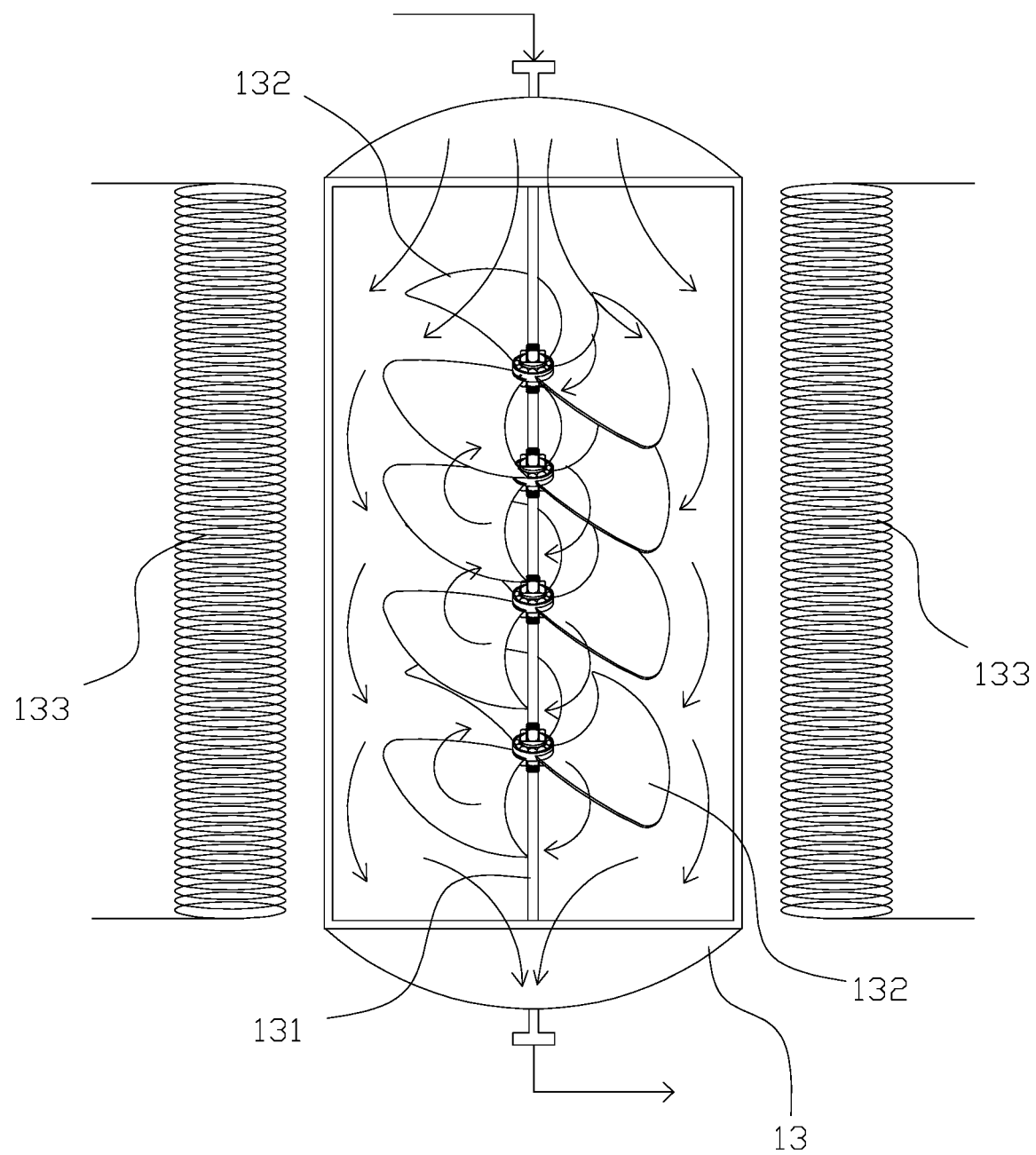
FIG. 3 is a schematic illustration of the internal structure of the reactor of the present invention.

As shown in FIG. 3, the reactor 13 comprises a rotating shaft 131, a plurality of fans 132 and at least one electrical heater 133. The rotating shaft 131 is mounted with the fan 132, and the electrical heaters 133 are attached to its periphery. The mono-silane gas entering the reactor 13 pushes the fans 132 generating turbulence, and the electrical heater 133 heats up the mono-silane for more efficient higher silane synthesis reaction.

As shown in FIG. 1, the silicon particle disposal system 50 comprises at least one filter set 51, a waste drum 52 and a dosing system 53. The microsilica generated by the higher silane synthesis reaction is screened by different filter sets 51. To clean the filter set 51, the filter set 51 is isolated and vacuumed to avoid oxidative combustion of microsilica exposed to the atmosphere, and then the blowback regeneration process is performed with nitrogen to displace micro silica for desorption and generating the anaerobic environment. The dosing system 53 adds an aqueous sodium hydroxide solution into the filter set 51 to mix remaining microsilica and the aqueous sodium hydroxide solution to form a sodium citrate solution and trace hydrogen and transfer them into the waste drum 52, and the filter set is cleaned with pure water to remove remaining sodium ions to avoid disilane generation by a contaminated synthesis reaction. The silicon particle disposal system comprises two filter sets 51 for alternating use, when one of the filter sets is loaded with too much microsilica and causing a pressure difference, another filter set 51 is employed.

Please refer to FIG. 1 and FIG. 2. The bottom of the first distillation column 21 is connected to a purification system of trisilane 60, and the purification system of trisilane 60 purifies trisilane and higher silane. The purification system of trisilane 60 further comprises a trisilane column 61 and a trisilane drum 62. The trisilane column 61 separate disilane and trisilane, trisilane base on the different boiling point, trisilane with high purity is stored in the trisilane drum 62, and trisilane, and disilane with low purity are drawn into the recycle drum 31 from the trisilane column 61 and the trisilane drum 62 to repeat the higher silane synthesis process. Furthermore, the trisilane drum 62 also employs the liquid nitrogen cooling system 40 to fill with −30° C. nitrogen for the cooling process.

Although the present invention has been explained in relation to its preferred embodiment, it is to be understood that many other possible modifications and variations can be made without departing from the spirit and scope of invention as hereinafter claimed.

What is claimed is:

1. A high-efficiency synthesis and purification recycling system of higher silane comprising:
   a reaction system for higher silane having a mono-silane drum, a mono-silane preheater, a reactor, a compressor, a hydrogen column and a mono-silane column, the mono-silane drum connected to the mono-silane preheater and the silane preheater connected to the reactor to heat mono-silane before entering into the reactor, the reactor connected to a silicon particle disposal system to pass and filter generated microsilica through the silicon particle disposal system, the silicon particle disposal system connected to the compressor, the hydrogen column and the mono-silane column, the hydrogen column removing non-condensed hydrogen, the mono-silane column connected to the bottom of the hydrogen column, mono-silane separated from the mono-silane column returned into the mono-silane preheater for recycling in the reaction system for higher silane;
   a purification system for disilane sequentially connected to a crude disilane drum, a first distillation column, a second distillation column, a third distillation column and a disilane drum, disilane and higher order silane compounds separated from a bottom of the mono-silane column stored in the crude disilane drum and then entering into the first distillation column, the second distillation column and the third distillation column for fractional purification, and purified high purity disilane stored in the disilane drum;
   a recycling system for disilane having at least one recycling drum connected to a plurality of import tubes and a recycling tube, the import tubes sequentially connected to the first distillation column, the second distillation column, the third distillation column and the disilane drum, low purity silane and disilane flowing into the recycling drum, helium gas added into the recycling drum sending recycled disilane liquid into the crude disilane drum through the recycling tube for further fractional purification; and
   a liquid nitrogen cooling system having a liquid nitrogen storage tank for storing and supplying nitrogen, the liquid nitrogen storage tank configured to distribute −196° C. liquid nitrogen via a first cooling tube to the hydrogen column and the silane column for a first cooling process; a second cooling tube configured to distribute −160° C. nitrogen after the first cooling process into the first distillation column, the second distillation column, the third distillation column and the recycling drum for a second cooling process, a third cooling tube configured to distribute −30° C. nitrogen after the second cooling process into the disilane drum for a third cooling process, a fourth cooling tube configured to distribute 25° C. nitrogen after the third cooling process into the silicon particle disposal system for a blowback regeneration process and to generate an anaerobic environment.

2. The high-efficiency synthesis and purification recycling system of higher silane as claimed in claim 1, wherein the reactor comprises a rotating shaft and a plurality of fins configured for generating turbulence in silane gas flowing into the reactor for an even heating process.

3. The high-efficiency synthesis and purification recycling system of higher silane as claimed in claim 2, wherein the reactor further comprises at least one electrical heater for heating silane.

4. The high-efficiency synthesis and purification recycling system of higher silane as claimed in claim 1, wherein the silicon particle disposal system further comprises at least one filter set, a waste drum and a dosing system; wherein microsilica is screened by the filter sets; to clean the filter set, the filter set is isolated and vacuumed and then the blowback regeneration process is performed with nitrogen to displace microsilica for desorption and generating the anaerobic environment; the dosing system adds an aqueous sodium hydroxide solution into the filter set to mix remaining microsilica and the aqueous sodium hydroxide solution to form a sodium citrate solution and trace hydrogen and transfer them into the waste drum; and the filter set is cleaned with pure water to remove remaining sodium ions to avoid disilane generation by a contaminated synthesis reaction.

5. The high-efficiency synthesis and purification recycling system of higher silane as claimed in claim 4, wherein the silicon particle disposal system comprises two filter sets for alternating use, and when one of the filter sets is loaded with too much microsilica and causing a pressure difference, another filter set is employed.

6. The high-efficiency synthesis and purification recycling system of higher silane as claimed in claim 1, wherein the recycling system for disilane has two recycling drums for alternating use, one draws in insufficient disilane gas with a cooling temperature difference and another raises the temperature up to 25° C. to generate pressure and employs helium gas to push disilane liquid back to the crude disilane drum.

7. The high-efficiency synthesis and purification recycling system of higher silane as claimed in claim 1, wherein a bottom of the first distillation column is connected to a purification system of trisilane, and the purification system of trisilane purifies trisilane and higher silane.

8. The high-efficiency synthesis and purification recycling system of higher silane as claimed in claim 7, wherein the purification system of trisilane further comprises: a trisilane column and a trisilane drum, the trisilane column separate disilane and trisilane, trisilane with high purity is stored in the trisilane drum, trisilane, and disilane with low purity are drawn into the recycle drum from the trisilane column and the trisilane drum to repeat the higher silane synthesis process.

* * * * *